United States Patent
Turner et al.

(10) Patent No.: US 7,812,779 B2
(45) Date of Patent: Oct. 12, 2010

(54) RFID TRANSCEIVER SENSITIVITY FOCUSING SYSTEM

(75) Inventors: Florrie Turner, Sutter, CA (US); Douglas Ahlers, Yuba City, CA (US)

(73) Assignee: InCom Corporation, Sutter, CA (US)

( * ) Notice: Subject to any disclaimer, the term of this patent is extended or adjusted under 35 U.S.C. 154(b) by 512 days.

(21) Appl. No.: 11/703,301

(22) Filed: Feb. 6, 2007

(65) Prior Publication Data

US 2008/0185540 A1 Aug. 7, 2008

(51) Int. Cl.
*H01Q 1/52* (2006.01)
(52) U.S. Cl. .................................................. 343/841
(58) Field of Classification Search ................ 343/841; 340/572.1; 434/350
See application file for complete search history.

(56) References Cited

U.S. PATENT DOCUMENTS

| | | | |
|---|---|---|---|
| 5,394,119 A | 2/1995 | Pleva | |
| 6,203,952 B1 | 3/2001 | O'Brien | |
| 7,176,799 B1* | 2/2007 | Golicz et al. | 340/572.1 |
| 7,551,087 B2* | 6/2009 | McAllister | 340/572.1 |
| 2003/0112187 A1 | 6/2003 | Whitehouse | |
| 2005/0092838 A1* | 5/2005 | Tsirline et al. | 235/449 |
| 2005/0150102 A1 | 7/2005 | Bosco | |
| 2005/0257411 A1 | 11/2005 | Wootton | |
| 2005/0280537 A1 | 12/2005 | Feltz | |
| 2006/0006885 A1 | 1/2006 | Helmut Bode | |
| 2006/0035205 A1 | 2/2006 | Dobson | |
| 2006/0290471 A1* | 12/2006 | Van Alstyne | 340/10.1 |
| 2007/0205953 A1* | 9/2007 | Bombay et al. | 343/841 |

FOREIGN PATENT DOCUMENTS

| | | |
|---|---|---|
| JP | 09-307304 | 11/1997 |
| JP | 2001-345632 | 12/2001 |

* cited by examiner

*Primary Examiner*—Huedung Mancuso
(74) *Attorney, Agent, or Firm*—Heisler & Associates

(57) ABSTRACT

Shielding of a particular material and geometry is interposed between a radio frequency identification ("RFID") antenna transceiver and a zone to be monitored by the antenna. The shielding has an aperture therein that to some extent defines a degree of focusing of the radio frequency ("RF") field associated with the antenna. RFID tags having appropriate RFID circuitry are only detected by the antenna when they pass within the focused RF field. The shielding is formed of a thin metalized plastic material, such as film used in forming antistatic material for storage of sensitive electronics. One particular formulation is primarily polyethylene film with an aluminum coating or layer thereon.

18 Claims, 4 Drawing Sheets

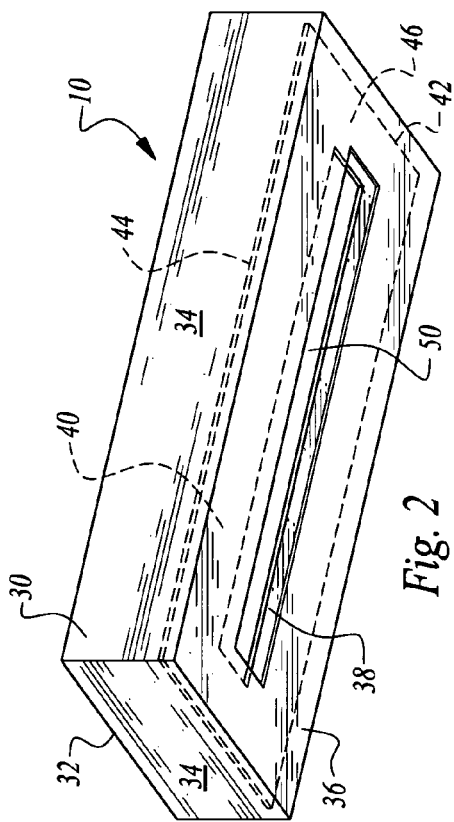
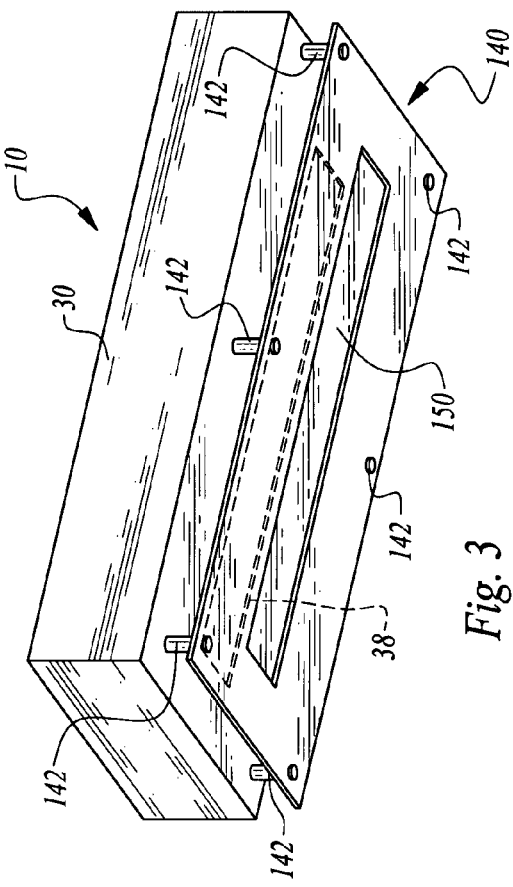
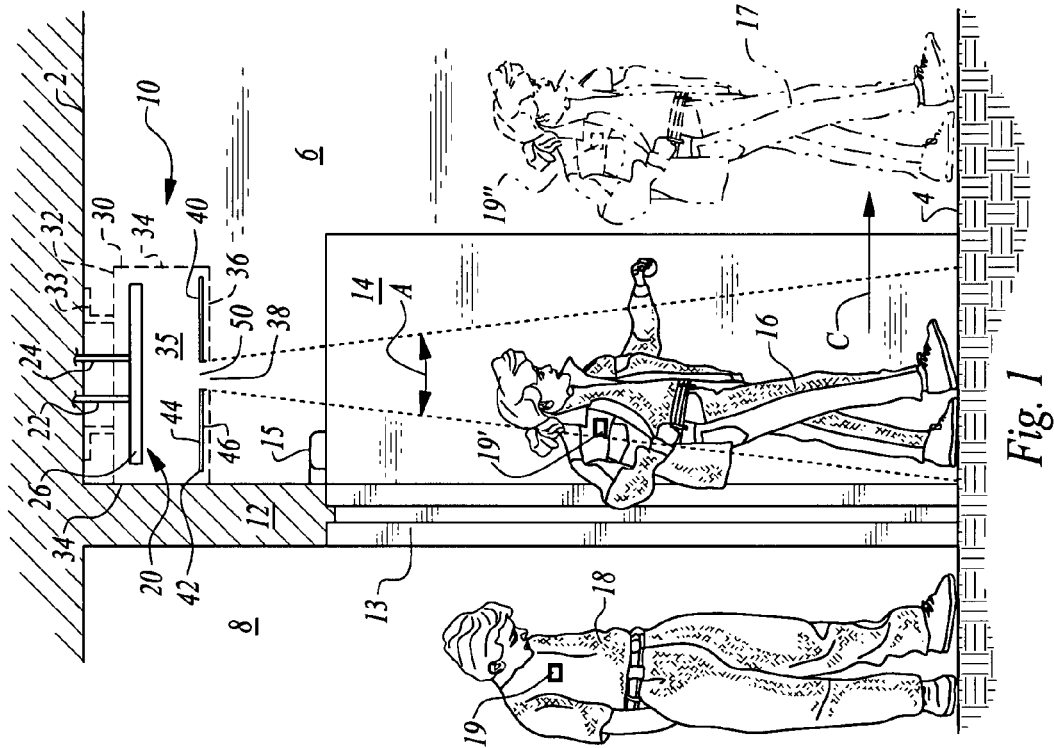

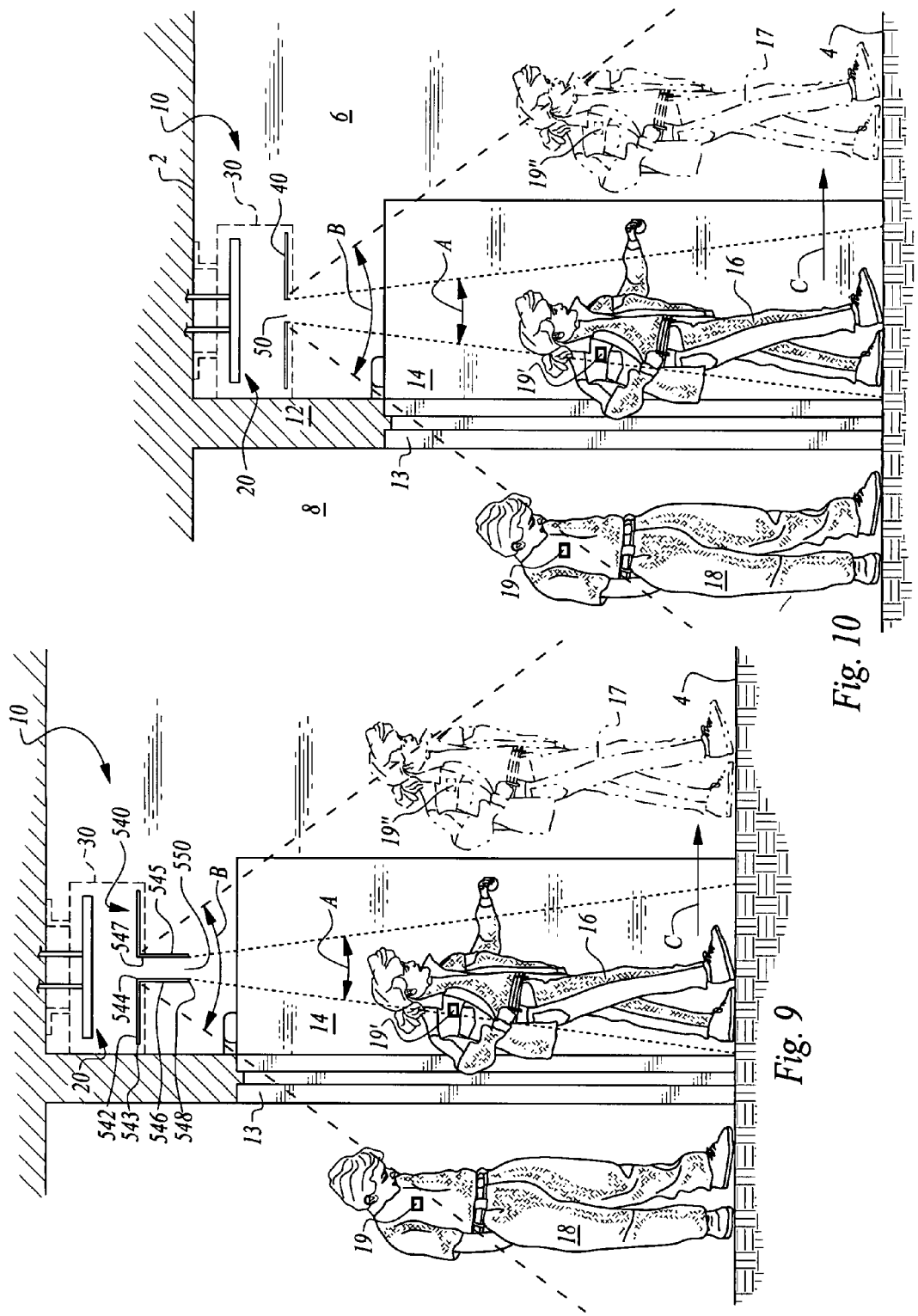

RFID TRANSCEIVER SENSITIVITY FOCUSING SYSTEM

FIELD OF THE INVENTION

The following invention relates to RFID transceiver antennas, and particularly to methods for focusing the sensitivity of the RFID transceiver antenna to minimize detection of portable RFID circuits located close to but outside of a monitoring zone to which the antenna is directed. The system and method of this invention can be directed to attendance monitoring systems with portable RFID circuits within tags or other holders borne by a participant or to other RFID detection systems.

BACKGROUND OF THE INVENTION

The applicants for the present application have previously developed an automated attendance tracking system. That system is disclosed in U.S. patent application Ser. No. 10/919,723, filed Aug. 16, 2004, published on Feb. 16, 2006 as Publication No. 2006/0035205, and the disclosure of that application is incorporated herein by reference in its entirety.

Generally, this and other Radio Frequency Identification ("RFID") systems have an RFID transceiver antenna which emits electromagnetic radiation, typically with a frequency/wavelength corresponding with radio waves. This radiation is referred to as an RF signal and produces an RF field. The intensity of radiation in this field varies depending on where in the field the intensity is measured, with the field generally decreasing in intensity the further it is measured from the antenna linearly along a center line aligned with a direction the antenna is pointing. The intensity of the field also generally decreases as it is measured with increasing lateral displacement from the center line. An RF field that maintains relatively high intensity is said to be more "sensitive" in that it can sense the presence of an RFID circuit, such as on a tag borne by a participant, at a relatively greater distance from the antenna. A field that maintains intensity along the center line, but which drops off relatively quickly in intensity lateral to the center line is said to be "focused."

The applicant's automated attendance monitoring system uses tags (worn or carried by students or other attendees) and readers to monitor the whereabouts of individuals. Thus, for instance, as students enter a classroom, the transceiver antenna of a reader placed near the door would interact with RFID circuits within the tags that are worn or carried by the students. The system would then track which students have entered the classroom, and by comparing the list of entering students with the class list, the system could generate a preliminary list of absent students (as well as present students). The teacher or other attendance monitor could then visually confirm attendance, and could use a handheld computer system to update and finalize the provisional attendance record.

In order for such an automated attendance tracking system to reliably monitor attendance, there must be constant, high quality communication between the tag and the antenna (also called the "transceiver") of the reader. A number of factors can affect the ability of the tag to communicate with the antenna of the reader.

First, the position of the tag relative to the antenna of the reader can affect "readability." Given current RFID technology, the tag should generally be parallel to the reader's antenna. For tracking the movement of inanimate objects, like inventory or crates, it is not difficult to maintain the tag in the proper orientation, but for humans, especially constantly moving students or employees, it is more difficult to maintain proper orientation.

Second, the signal emitted from the antenna of the reader maintains functional sensitivity in a somewhat conical shape RF field starting with a small cross-section (perpendicular to the center line extending from the antenna) close to the antenna and getting larger as the RF field extends farther away from the antenna. Because of this conical shape, tags that should not be read can be read, even though the tags are in locations where tag reading is not desired. For instance, students outside of a classroom and walking past a door to the classroom might have their tags read even though they never pass through the door. This problem exists in many applications of RFID equipment in other industries. Technicians are continually looking for ways to shield areas from the RF emitted from RFID equipment, so as to not read tags in certain locations.

Metal is commonly used as RF fields generally do not penetrate metal. Metal, however, has limitations, such as an undesirable ability to reflect RF electromagnetic radiation and can cause problems with ghosting of tags, and attenuating the strength of the RF field. This can cause non-reading of tags and lower the performance and reliability of the equipment. Known prior art RF absorption material has been found to be inadequate, as it did not control the location or focus of the RF field to a desired location. RF absorption materials also attenuate the RF signal significantly, so that maintaining accurate tag reads is made more difficult. Other RF shielding materials are commonly used to protect electronic equipment from interference. This invention is used to focus the RF field into a desired location without attenuating the strength of the RF signal or sacrificing any other performance characteristics.

SUMMARY OF THE INVENTION

With this invention, shielding is provided which focuses the sensitivity of the RF field created by the RFID transceiver antenna. The shielding can be placed adjacent the antenna with only an aperture through the shielding provided, to focus the RF field to have its highest sensitivity directed at a monitoring zone where RFID tag circuits are to be detected. As an alternative, the shielding can be placed surrounding an area where RFID tags might be present but are not to be detected by the system, such as on some sort of partition.

The shielding material includes thin metalized plastic film, such as that utilized in anti-static bags provided as packaging for sensitive electronic equipment, such as microchips, memory chips, printed circuit boards, and other sensitive electronic equipment. One particular metalized plastic film found to be effective in focusing the RF field and shielding areas from the RFID antenna is a thin plastic anti-static film formed as a laminate of a polyethylene layer and a polyethylene terephthalate layer. Preferably, aluminum or other electrically conductive metal is added to one of the layers of the laminate or between the layers, or otherwise added to the thin plastic film if only one layer is provided. For instance, the aluminum can be added by vapor deposition to the film, or can be formed as a foil and added as an additional layer to the film. The aluminum or other metal would typically provide less than one percent of the mass of the overall plastic film.

Typically, the antenna is located within an enclosure with an opening in the enclosure facing a direction where RFID tags are to be monitored. The shielding can be provided in a plane that is substantially horizontal below the antenna with the antenna facing downwardly, and with an aperture in the shielding to allow a focused RF field to form below the shielding, comprising a monitoring zone. For instance, such a zone can be just inside of a door leading into a room where attendance is to be monitored. Participant attendees would wear an RFID badge/tag including an RFID circuit therein, encoded with information that allows individual attendees to be distinguished from each other.

Alternatively, this shielding can be oriented in vertical planes surrounding an aperture below the downwardly facing antenna. The position of the shielding can be closer to the antenna or further from the antenna, depending on the degree of focusing of the RF field desired. Also, if a nearby region has RFID tags therein which are not to be monitored, shielding can be oriented between the antenna and the region where RFID tags are not to be read, so that the shielding acts as a wall precluding RFID transceiver antenna sensing of such RFID circuits outside of the zone to be monitored.

The focusing system of this invention can be applied in any RFID system where there are tags in the general area that are not to be read. Examples other than the attendance tracking system described above include assembly lines located close to each other, conveyor belts located next to or close to each other, dock doors located next to each other, etc. The focusing system of this invention may be used with any RFID system where the read zone needs to be limited by size by signal strength needs to be maintained. In other words, this system limits the size of the read zone without attenuating the RF signal strength.

OBJECTS OF THE INVENTION

Accordingly, a primary object of the present invention is to provide a system for passively detecting the presence of RFID circuits, such as provided on tags through a monitoring zone proximate to an antenna, while not detecting RFID circuits outside of this monitoring zone.

Another object of the present invention is to provide shielding which can shape an RFID shield associated with an RFID transceiver antenna to restrict RFID transceiver antenna sensitivity to a small zone.

Another object of the present invention is to provide shielding for an RFID antenna which allows the RFID antenna to be mounted inside of and near a door to accurately detect substantially all RFID circuit tags passing through the door and not detecting RFID circuit tags located outside of the doorway.

Another object of the present invention is to provide a method for enhancing the precision with which RFID transceiver antennas monitoring zones can be established; and zones to not be monitored can be precluded from sensing.

Another object of the present invention is to provide an RFID transceiver antenna which has a small zone of monitoring sensitivity.

Other further objects of the present invention will become apparent from a careful reading of the included drawing figures, the claims and detailed description of the invention.

BRIEF DESCRIPTION OF THE DRAWINGS

FIG. 1 is a side elevation view of a doorway with an RFID transceiver antenna mounted over the doorway and with shielding according to this invention interposed between the antenna and the doorway, illustrating the function of this invention.

FIG. 2 is a perspective view of an enclosure in which the antenna and shielding are located according to a preferred embodiment.

FIG. 3 is a perspective view similar to that which is shown in FIG. 2 but with the shielding oriented outside of the enclosure.

FIG. 9 is a side elevation view similar to that which is shown in FIG. 1 but with a sixth alternative shielding configuration.

FIG. 10 is a side elevation view similar to that which is shown in FIG. 1 and further illustrating how a zone of sensitivity of the RFID transceiver antenna is adjusted by the presence of shielding according to this invention.

DESCRIPTION OF THE PREFERRED EMBODIMENT

Figure 4:
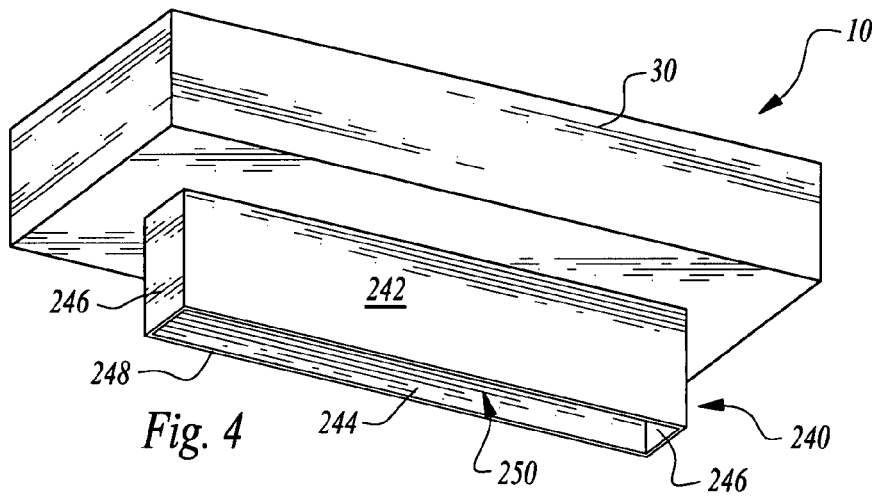
FIG. 4 is a perspective view similar to that which is shown in FIG. 2 but with the shielding shown oriented in separate vertical planes surrounding an aperture for focusing the sensitivity of an RF field below an RFID transceiver antenna located within the enclosure.

Referring to the drawings, wherein like reference numerals represent like parts throughout the various drawing figures, reference numeral 10 is directed to a system for focusing the sensitivity of an RFID transceiver. The system 10 can be utilized as part of an attendance tracking system, such as with an antenna 20 mounted above and just inside of a door 14 into a room 6 where attendance is to be tracked. With this system 10, the RF field generated by the transceiver antenna 20 is focused by shielding 40 so that attendees 16, 17 can have their associated RFID circuitry tags 19', 19" read while a non-attendee 18 outside of the room 6, such as in an adjacent hallway 8, who is also wearing an RFID tag 19, does not have his tag read. Such focusing of the sensitivity of the RFID transceiver antenna 20 improves the accuracy with which a variety of different RFID systems can function to record the presence or absence of RFID tags 19 within a monitoring zone.

Figure 5:
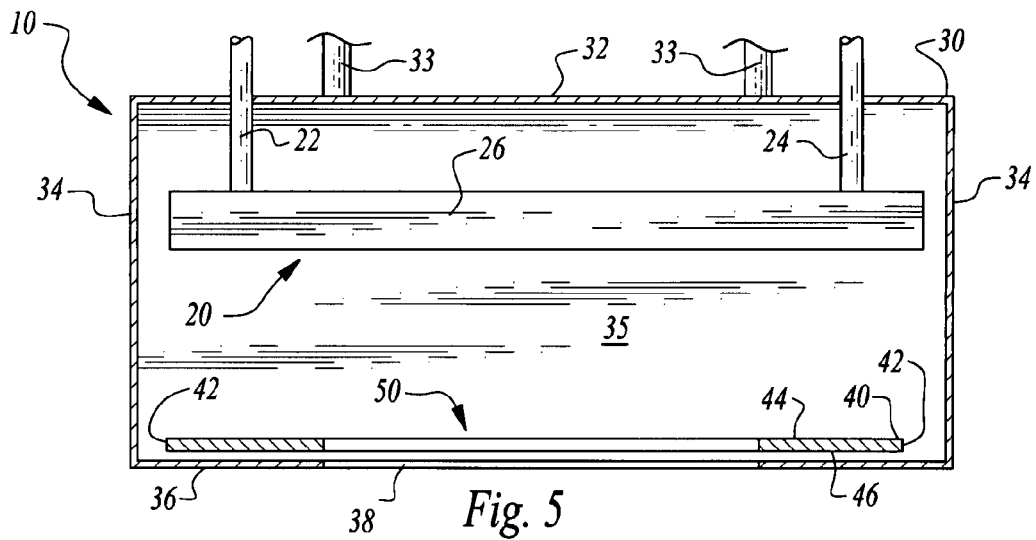
FIG. 5 is a full sectional view of that which is shown in FIG. 2.

In essence, and with particular reference to FIGS. 1, 2 and 5, basic details of the system 10 of this invention are described, according to a preferred embodiment. The system 10 for focusing the sensitivity of the RF field created by an RFID transceiver antenna 20 generally includes an antenna 20 which is typically (but not necessarily) contained within an enclosure 30. Shielding 40 is beneficially provided between the antenna 20 and a zone (depicted by dashed lines spaced by arrow A in FIG. 1), where the presence of RFID tags 19' is to be monitored. The shielding 40 has an aperture 50 therein which is bounded on at least one side, and most preferably completely surrounded by the shielding 40. The shielding 40 enhances the sensitivity of the RF field and the associated ability of the antenna 20 to detect the presence of an RFID tag 19' within the RF field within a narrow conical zone, depicted by arrow A (FIG. 1). Outside of this zone, the RF field is attenuated to the point that RFID tags 19 outside of the zone A are not detected by the antenna 20. In contrast, a wider zone of sensitivity (such as that depicted by arrow B of FIG. 10) would exist without utilization of this shielding 40. The shielding 40 acts as a lens to focus the RF field along a centerline extending perpendicularly from the antenna 20 (typically in a vertically downward direction). Intensity of the RF field is increased along this centerline, it is attenuated as the field extends laterally away from this centerline. The shielding 40 is formed of a thin metalized plastic film.

More specifically, and with particular reference to FIG. 1, details of an environment in which the system 10 is utilized in one embodiment of this invention is described. For this embodiment, the RFID transceiver antenna 20 is part of an attendance tracking system for detecting the presence of individuals (or their absence) from a particular room 6 where attendance is to be kept. In such a typical room 6, a ceiling 2 defines an upper portion of the room with a floor 4 opposite the ceiling 2. A hall 8 outside of the room 6 is spaced from the room 6 by a wall 12. An entry 13 forms a pathway through the wall 12 which is typically occluded by a door 14 which often includes a closure device 15 thereon to keep the door 14 closed unless an individual is passing therethrough.

The system 10 is most typically mounted to the ceiling 2 and is oriented with a centerline of the antenna 20 extending vertically downward. The system 10 is mounted just inside of the door 14 so that a monitoring zone associated with the system 10 is just inside of the door 14 to detect individuals as they pass into the room 6 (or out of the room 6).

In particular, and as shown in FIG. 1, three types of individuals can be identified. First, an attendee 16 wearing an RFID tag 19' passing through a monitoring zone depicted by arrow A has an associated RFID tag 19' read by the antenna 20 as the attendee 16 passes through the monitoring zone, along arrow C. A second attendee 17 having a separate RFID tag 19" that had previously passed through the monitoring zone and had had its RFID tag read is far enough inside the room that no further detection occurs.

In the case where the system 10 is used as part of an attendance tracking system, a computer is typically utilized to keep track of which individual is associated with which RFID tag 19 and to keep an active list of the presence (or absence) of various different individuals within the room 6. Such a system beneficially does not inadvertently record the presence of individuals who are not inside the room 6. For instance, a non-attendee 18 standing in the hallway 8 outside of the room 6 should have an associated RFID tag 19 which is not sensed by the antenna 20, because the antenna 20 has been focused sufficiently to keep a zone of sensitivity for the antenna 20 substantially entirely inside of the room 6.

This implementation of the system 10 is merely exemplary, with the system 10 being optionally deployed in a multitude of different arrangements to detect RFID tag 19 bearing individuals or other items as they pass through a monitoring zone. The antenna 20 is not necessarily oriented with a centerline extending therefrom in a vertical downward direction, but optionally could have a variety of other orientations. The area being monitored could be a hallway just inside a building or a pathway or other area where the passage of individuals or items bearing RFID tags 19 can be tracked.

With continuing reference to FIGS. 1, 2 and 5, particular details of the antenna 20 and associated enclosure 30 are described. The antenna 20 is of a variety which is suitable for use in an RFID system such that the antenna 20 both transmits and receives (thus being termed a "transceiver") and typically with an RF bandwidth, but optionally with other bandwidths suitable for detecting the presence of RFID tags 19 or corresponding circuitry having different wavelength sensitivity. The particular configuration of the antenna 20 is only generally outlined, with it being understood that the antenna 20 would be modified to match the performance characteristics desired for the RFID system in which the sensitivity focusing system 10 of this invention is to be implemented.

The antenna 20 typically is also located within an enclosure 30 to protect the antenna 20 from damage and to otherwise protect the antenna 20 by at least partially concealing the antenna 20 from view. Such an enclosure 30 is not strictly required, but typically forms a metal box substantially surrounding the antenna 20.

The antenna 20 is depicted with a power line 22 and a signal line 24 both coupled to a body 26 of the antenna. The power line 22 supplies power to the antenna 20. The signal line 24 receives signals to be transmitted and signals received by the antenna 20. It is conceivable that both the power line 22 and signal line 24 could be integrated together, with this depiction of the power line 22 and signal line 24 being separate merely displaying one possible arrangement for providing power to the antenna 20 and providing for the antenna 20 to communicate with a computer or other equipment coupled to the antenna 20. The body 26 can have a configuration deemed necessary to optimize performance of the system 10 for focusing the sensitivity of the RF field or the overall system in which the system 10 of this invention is utilized.

The enclosure 30 would typically have a rectangular form including a top wall 32 parallel with and spaced from a bottom wall 36. The top wall 32 and bottom wall 36 are typically substantially planar. Side walls 34 join the top wall 32 and bottom wall 36 and are typically planar and extend in vertical planes. Mounting brackets 33 are typically provided on the top wall 32 to facilitate its mounting to the ceiling 2 or other structures from which the antenna 20 is to be deployed.

The enclosure 30 has an interior 35 in which the body 26 of the antenna 20 is housed. An opening 38 is formed in the bottom wall 36 with this opening 38 sufficiently large to prevent the enclosure 30 from excessively attenuating the RF field emanating from the antenna 20 or causing undesirable distortion of the RF field. With the enclosure 30 formed of metal, it is expected that the enclosure 30 itself will have some affect in shaping and altering the sensitivity of the RF field to the presence of RFID tags 19 within the field. However, when the shielding 40 is utilized according to this invention, the shielding 40 has a significantly greater affect on the shaping of the RF field such that affects of the enclosure 30 on the shape and focusing of the sensitivity of the RF field is either eliminated entirely or can at a minimum be reduced to secondary significance.

With continuing reference to FIGS. 1, 2 and 5, particular details of the shielding 40 are described according to a preferred embodiment. The shielding 40 benefits from having both important geometric aspects and compositional aspects which function together in the preferred embodiment to optimize focusing of the sensitivity of the RF field emanating from the RFID transceiver antenna 20. In certain embodiments of this invention, the geometric aspects of the shielding 40 alone can provide some significant benefit. In other embodiments, the compositional aspects of the shielding 40 alone can provide some meaningful benefit. For instance, the shielding 40 could be utilized by lining a barrier so that RFID tags on a side of the barrier opposite the antenna 20 are precluded from being read.

In particular, the shielding 40 most preferably has the following geometric details in the preferred embodiment. The shielding 40 is provided as a thin planar sheet of material having an upper surface 34 parallel with and spaced from a lower surface 46 by a distance defining a thickness of the shielding 40. This thickness is typically between 2 mil and 6 mil. A perimeter edge 42 defines a perimeter of the shielding 40. In the preferred embodiment, the shielding 40 is oriented inside of the enclosure 30 and surrounding the opening 38 in the enclosure 30.

An aperture 50 in the shielding 40 is sized to generally correspond with a size and shape of the opening 38 in the enclosure 30. The shielding 40 beneficially allows the RF field to pass through the opening 38 and to the monitoring zone below the opening 38 and aperture 50, with the shielding 40 beneficially focusing a sensitivity of the RF field along a centerline of the field extending perpendicularly to the shielding 40, and extending vertically down from the antenna 20 when the antenna 20 is oriented facing vertically down. In contrast to configuring the enclosure 30 for use without the shielding 40, the enclosure 30 itself has a tendency to disadvantageously excessively attenuate the RF field's intensity, unless the opening 38 is made excessively large. When the opening 38 is made excessively large, the RF field then has a tendency to be too wide and have too great of a sensitivity along lateral edges spaced laterally a significant distance from the centerline of the monitoring zone. With the shielding 50, such attenuation is minimized, and rather a sensitivity of the antenna 20 is focused along the centerline.

While this centerline is described in two dimensions as being aligned, it is in fact a three dimensional shape with the monitoring zone typically being a somewhat conical space but with horizontal cross-sections thereof being generally oval in shape due to the aperture 50 having a rectangular form (FIG. 2). This monitoring zone is defined by a region where a sensitivity of the RF field is sufficiently great to detect the presence of an RFID tag 19 therein. The zone can thus have a greater width than depth so that it has a width similar to (and typically somewhat greater than) a width of a door 14 passing into the room 6.

In alternative embodiments, the shielding 40 can have different geometric configurations depending on the focusing needs for the RF field, the height of the system 10 mounted upon a ceiling 2 above the floor 4, and potentially other factors that would benefit from experimentation to optimize the configuration of the shielding 40.

Figure 6:
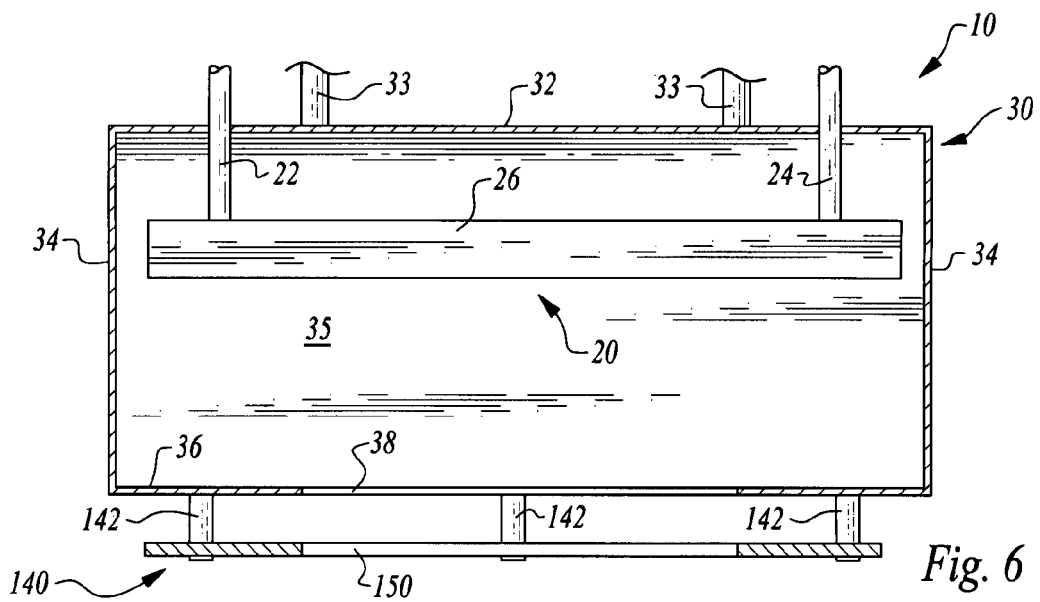
FIG. 6 is a full sectional view of that which is shown in FIG. 3.

In particular, and with reference to FIGS. 3 and 6, an embodiment of the system 10 is depicted with alternate shielding 140 which is outside of the enclosure 30. In this embodiment, standoffs 142 are provided to hold the alternate shielding 140 horizontally and spaced from the bottom wall 36 of the enclosure 30. An aperture 150 is provided in the alternate shielding 140 for focusing of the RF field associated with the antenna 20. The length of the standoffs 142 can vary to provide the desired degree of focusing.

With particular reference to FIG. 4, different alternate shielding 240 is depicted in the form of vertically extending sheets. In particular, a front sheet 242 is provided opposite a rear sheet 244 and with side sheets 246 extending from the front sheet 242 to the rear sheet 244. Lower edges 248 of the sheets 242, 244, 246 define the aperture 250 in this alternative embodiment. This shielding 240 extends downward from the enclosure 30 in a preferred form of this alternative embodiment.

Figure 7:
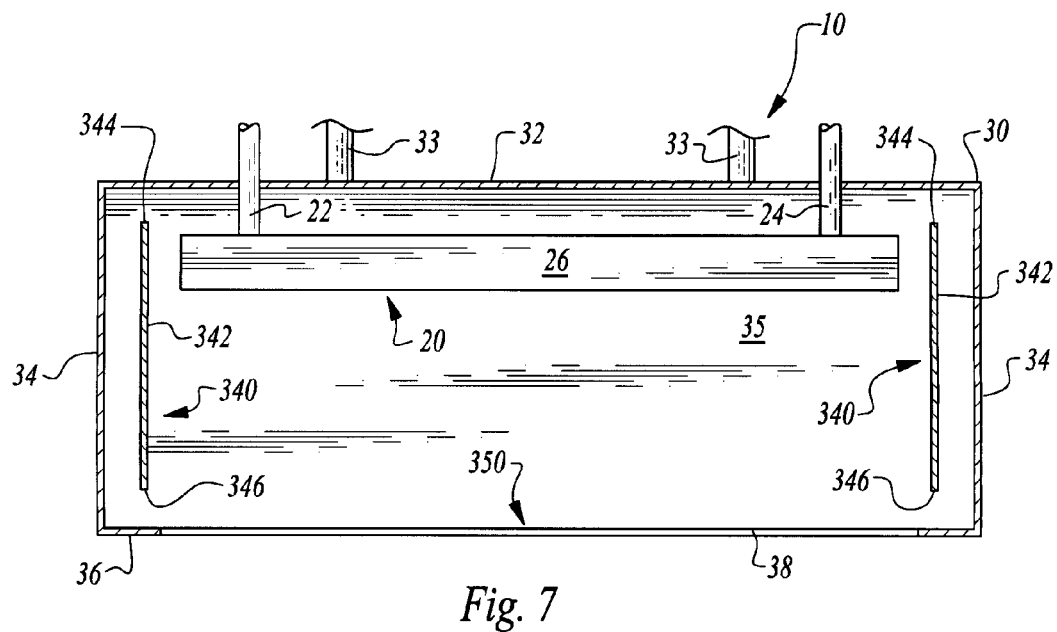
FIG. 7 is a full sectional view of a fourth alternative shielding configuration according to this invention.

In another alternative embodiment, alternate shielding 340 is provided (FIG. 7) where the shielding 340 is provided in vertically oriented sheets, but within the enclosure 30. In this embodiment, side sheets 342 are shown extending from an upper edge 344 to a lower edge 346. This alternate shielding 340 can be provided in two separate sheets or with four sheets completely surrounding the antenna 20 and isolating the antenna 20 to minimize interaction with the enclosure 30.

Figure 8:
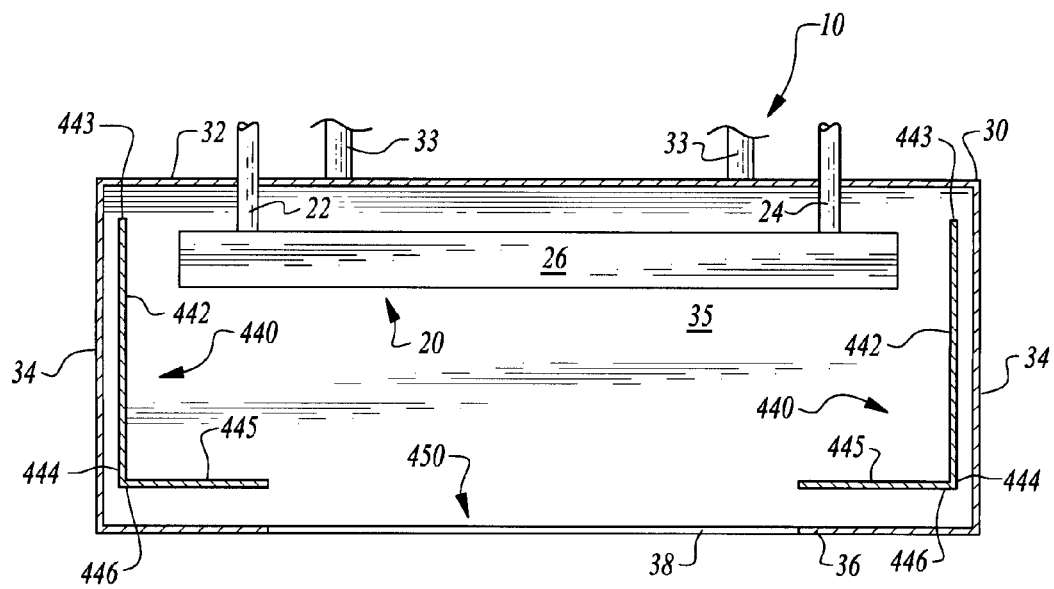
FIG. 8 is a full sectional view of a fifth alternative shielding configuration according to this invention.

In FIG. 8, still further alternate shielding 440 is depicted with the enclosure 30 having a smaller opening 38 and with the alternate shielding 440 shown with both a plurality of side sheets 442 which are oriented vertically and a horizontal sheet 445 extending substantially horizontally. In particular, the side sheets 442 extend from an upper edge 443 downward to a lower edge 444. A horizontal sheet 445 is joined to the lower edge 444 at a perimeter edge 446. An aperture 450 is formed within the horizontal sheet 445. In such an arrangement, the benefits of the shielding 40 of FIG. 5 and the shielding 340 (FIG. 7) are combined somewhat to most completely isolate the antenna 20 from the enclosure 30.

In FIG. 9 a still further alternate shielding 540 is depicted which is partially within the enclosure 30 and partially outside of the enclosure 30. In particular, a horizontal sheet 542 is located within the enclosure 30 with the horizontal sheet 542 bounded by a perimeter edge 543 around a perimeter thereof and an inner edge 544 surrounding an inner opening through the horizontal sheet 542. A vertical front sheet 545 extends down from this inner edge 544. A vertical rear sheet 546 also extends down from the inner edge 544, parallel with and spaced from the vertical front sheet 545. The vertical sheets 545, 546 have vertical top edges 547 where the sheets 545, 546 are coupled to the horizontal sheet 542 and extending down to vertical bottom edges 548 which define an aperture 550 for this alternate shielding depicted in FIG. 9. FIG. 9 also depicts how the RF field has a sensitivity a significant lateral distance away from a centerline of the field (depicted by arrow B) without the shielding, and how the RF field is focused (depicted by arrow A) with utilization of the shielding 540, or other shielding of other embodiments according to this invention.

The shielding 40 also has compositional attributes which minimize attenuation of the RF field and to some degree appear to be enhance the sensitivity of the RF field closer to a centerline of the RF field. In particular, the material forming the shielding 40 is preferably thin metalized plastic film. While this plastic film could have a variety of different constituent plastics and could have a variety of different metalization arrangements to exhibit to a greater or lesser degree the beneficial attributes according to this invention, a most preferred composition is to have the film formed of at least two plastic layers bonded together with a first layer of primarily polyethylene and a second layer of primarily polyethylene terephthalate or polyester.

The film is metalized, preferably with aluminum, according to a preferred embodiment of the invention. The amount of metal added to the film is primarily less than one percent of an overall mass of the film. The film is typically at least partially transparent to light. Aluminum is preferably used as the metal to metalize the film, with such metalization occurring through a process such as vapor deposition, or the bonding of an exceedingly thin foil to the plastic film. It is conceivable that the shielding material could be formed without any metalization and still exhibit some of the benefits according to this invention. It is conceivable that various different plastics could be utilized with or without metalization of the film to provide some of the beneficial attributes of this invention.

In one embodiment, any thin film which beneficially exhibits anti-static attributes, such that it could be effectively utilized as anti-static packaging, could also beneficially be utilized as the shielding 40 according to this invention.

One particular composition which has proven to be effective as the shielding 40 is marketed under the trademarks SCC 1000, SCC 1500, SCC ZIP TOP, DRI-SHIELD 2000, DRI-SHIELD 2500, DRI-SHIELD 2700 or FOIL BAG by Uline, Inc. of Waukegan, Ill. While the particular construction and formulation of this material is believed to be a trade secret of this company, material safety data sheets provided by the company identify this material as being 60-85% (weight) polyethylene film (CAS #9002-88-4), 10-35% (weight) polyethylene terephthalate film (CAS #25038-59-9), 2-5% (weight) of an adhesive, less than 1% (weight) of a quaternary ammonium compound and less than 1% (weight) aluminum alloy. The polyethylene terephthalate film may be replaced with or defined as a polyester layer. The amounts of these constituents can vary provided that the overall composition has the effect of focusing the sensitivity of the RF field according to this invention.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:

1. A system for focusing sensitivity of an RFID transceiver, the system comprising in combination:
    an RFID transceiver antenna;
    said RFID transceiver antenna adapted to be located proximate to but spaced from a monitoring zone;
    said RFID transceiver antenna adapted to establish an RF field within the monitoring zone;
    shielding interposed between said antenna and the monitoring zone;
    an aperture formed in said shielding;
    said shielding formed at least partially of thin plastic anti-static film;
    wherein said antenna includes a body with a lower surface oriented in a substantially horizontal plane, both said body of said antenna and said shielding oriented to overlie said monitoring zone; and
    wherein said shielding includes at least two separate sheets oriented parallel with each other and spaced from each other by a distance at least as great as a width of said aperture, said separate sheets oriented non-horizontally.

2. The system of claim 1 wherein said plastic film includes polyethylene.

3. The system of claim 2 wherein said plastic film includes a majority polyethylene.

4. The system of claim 3 wherein said plastic film includes aluminum therein.

5. The system of claim 4 wherein said plastic film includes between ten percent and thirty-five percent polyethylene terephthalate.

6. The system of claim 5 wherein said plastic film includes less than one percent aluminum.

7. The system of claim 6 wherein said plastic film is a laminate structure including a polyethylene layer and a polyethylene terephthalate layer and with an adhesive bonding said polyethylene layer to said polyethylene terephthalate layer.

8. The system of claim 1 wherein said thin plastic anti-static film is metalized plastic film.

9. The system of claim 8 wherein said metalized plastic film includes a majority polyethylene.

10. The system of claim 8 wherein said metalized plastic film includes polyethylene terephthalate.

11. The system of claim 8 wherein said metalized plastic film includes less than one percent metal.

12. The system of claim 1 wherein said shielding is located within an enclosure along with said antenna.

13. The system of claim 12 wherein said shielding is oriented substantially in a plane, with said plane substantially perpendicular to a line extending from said antenna to a center of said monitoring zone.

14. The system of claim 1 wherein said shielding is located in a substantially horizontal plane.

15. The system of claim 1 wherein said shielding includes four separate sheets with each of said sheets oriented within a separate vertical plane and with each of said four sheets surrounding a border of said aperture, and with each of said sheets located adjacent two other sheets.

16. An RFID transceiver antenna featuring a focused RF field pattern, comprising in combination:
    an antenna body;
    shielding proximate to but spaced from said body;
    an aperture in said shielding;
    said shielding formed at least partially of anti-static film;
    wherein said shielding is formed of thin metalized plastic;
    wherein said film includes polyethylene terephthalate;
    wherein said film includes both polyethylene and polyethylene terephthalate, with more polyethylene than polyethylene terephthalate; and
    wherein said film is a laminate including at least two layers with a first layer formed primarily of polyethylene and a second layer formed primarily of polyethylene terephthalate.

17. The antenna of claim 16 wherein said film is greater than fifty percent polyethylene.

18. The antenna of claim 16 wherein said film includes aluminum therein.

* * * * *